(12) United States Patent
Luo et al.

(10) Patent No.: US 11,249,209 B1
(45) Date of Patent: Feb. 15, 2022

(54) SYSTEMS AND METHODS FOR DETERMINING A LIKELIHOOD OF STRIKING SUBSURFACE GEOHAZARDS USING CODA WAVE TRAINS

(71) Applicant: Saudi Arabian Oil Company, Dhahran (SA)

(72) Inventors: Yi Luo, Dhahran (SA); Mohammed Mubarak, Dhahran (SA); Tong Wang Fei, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/240,303

(22) Filed: Apr. 26, 2021

(51) Int. Cl.
*G01V 1/30* (2006.01)
*E21B 49/00* (2006.01)
*G01V 1/34* (2006.01)
*G01V 1/36* (2006.01)

(52) U.S. Cl.
CPC ............ *G01V 1/301* (2013.01); *E21B 49/003* (2013.01); *G01V 1/307* (2013.01); *G01V 1/34* (2013.01); *G01V 1/366* (2013.01)

(58) Field of Classification Search
USPC ......................................................... 702/16
See application file for complete search history.

(56) References Cited

U.S. PATENT DOCUMENTS

| 3,812,457 A * | 5/1974 | Weller | G01V 1/366 367/36 |
| 5,671,136 A | 9/1997 | Willhoit, Jr. | |
| 7,796,468 B2 | 9/2010 | Kellogg | |
| 2009/0168599 A1* | 7/2009 | Suarez | G01V 1/42 367/35 |
| 2021/0164945 A1* | 6/2021 | Jiang | G01N 29/50 |

OTHER PUBLICATIONS

Aki et al. "Origin of Coda Waves: Source, Attenuation, and Scattering Effects", Journal of Geophysical Research vol. 80, No. 23, Aug. 10, 1975, 21 pgs.

* cited by examiner

*Primary Examiner* — Paul D Lee
(74) *Attorney, Agent, or Firm* — Dinsmore & Shohl LLP

(57) ABSTRACT

A method includes generating a seismic shot by a seismic source, the seismic shot directed at a geological subsurface, and receiving, by one or more receivers, a plurality of reflected seismic traces from the seismic shot. The method further includes generating a correlogram of each reflected seismic trace to generate a plurality of correlograms, isolating a coda wave train of each correlogram of the plurality of correlograms, and computing an energy ratio between an energy of the coda wave train of each correlogram and a total energy of a corresponding correlogram of the plurality of correlograms to generate a plurality of energy ratios. The method further includes determining an average of the plurality of energy ratios to generate an average energy ratio of the seismic shot and determining a likelihood of striking a subsurface geohazard when drilling into the geological subsurface based on the average energy ratio.

20 Claims, 7 Drawing Sheets

SYSTEMS AND METHODS FOR DETERMINING A LIKELIHOOD OF STRIKING SUBSURFACE GEOHAZARDS USING CODA WAVE TRAINS

TECHNICAL FIELD

The present specification generally relates to geophysical data interpretation and, more particularly, to systems and methods for determining a likelihood of striking subsurface geohazards by isolating and analyzing coda wave trains of seismic traces from correlograms.

BACKGROUND

Seismic exploration involves the generation of raw seismic data by providing seismic energy at various points within a surveyed location. When propagating through the subsurface, the seismic energy may encounter various changes or inconsistencies in subsurface properties (e.g., changes in density, porosity, and material). For example, the seismic energy may reflect back towards the surface at interfaces between various substrata or other discontinuities. Such reflections may have varying frequency, amplitude, and phase characteristics based on the nature of the discontinuity encountered by the seismic energy. By measuring seismic energy reflections, information regarding subsurface formations can potentially be obtained. For example, a plurality of receivers may be used to generate a plurality of traces, with each trace containing information regarding the reflections of the seismic energy propagating through the subsurface.

The process of deducing subsurface features from collected seismic data is known as geophysical data interpretation. Deduction of complex subsurface features, such as subsurface geohazards, from raw seismic data is difficult because each trace may represent a combination of reflections from a plurality of different subsurface features.

Accordingly, a need exists for an alternative determination of subsurface geohazards from raw seismic data that implements an efficient and accurate solution.

SUMMARY

According to an embodiment of the present disclosure, a method includes generating a seismic shot by a seismic source, the seismic shot directed at a geological subsurface, and receiving, by one or more receivers, a plurality of reflected seismic traces from the seismic shot. The method further includes generating a correlogram of each reflected seismic trace of the plurality of reflected seismic traces to generate a plurality of correlograms, isolating a coda wave train of each correlogram of the plurality of correlograms, and computing an energy ratio between an energy of the coda wave train of each correlogram and a total energy of a corresponding correlogram of the plurality of correlograms to generate a plurality of energy ratios. The method further includes determining an average of the plurality of energy ratios to generate an average energy ratio of the seismic shot; determining a likelihood of striking a subsurface geohazard when drilling into the geological subsurface based on the average energy ratio.

In another embodiment, a method includes generating a plurality of seismic shots by one or more seismic sources, the plurality of seismic shots directed at a geological subsurface, and receiving, by one or more receivers, a plurality of reflected seismic traces from each seismic shot of the plurality of seismic shots. The method further includes generating a correlogram of each reflected seismic trace of the plurality of reflected seismic traces of each seismic shot to generate a plurality of correlograms of each seismic shot, isolating a coda wave train of each correlogram of the plurality of correlograms of each seismic shot, and computing an energy ratio between an energy of the coda wave train of each correlogram and a total energy of a corresponding correlogram to generate an energy ratio of each correlogram generated from each reflected seismic trace from each seismic shot, thereby generating a plurality of energy ratios for each seismic shot. The method further includes determining an average of the plurality of energy ratios of each seismic shot to generate an average energy ratio for each seismic shot, and determining a likelihood of striking a subsurface geohazard when drilling into the geological subsurface based on the average energy ratio for each seismic shot.

In yet another embodiment, a seismic analysis system includes a seismic data collection system. The seismic data collection system further includes one or more seismic sources and one or more receivers. The seismic analysis system further includes one or more processors communicatively coupled to the one or more receivers and one or more non-transitory memory modules communicatively coupled to the one or more processors and storing machine-readable instructions that, when executed, the machine-readable instructions cause the one or more processors to generate a correlogram of each of a plurality of reflected seismic traces received by the one or more receivers from a plurality of seismic shots generated by the one or more seismic sources to generate a plurality of correlograms of each seismic shot of the plurality of seismic shots, the one or more receivers receiving a plurality of reflected seismic traces from each seismic shot, isolate a coda wave train of each correlogram of the plurality of correlograms of each seismic shot, and compute an energy ratio between an energy of the coda wave train of each correlogram and a total energy of a corresponding correlogram to generate an energy ratio of each correlogram generated from each reflected seismic trace from each seismic shot, thereby generating a plurality of energy ratios for each seismic shot. The machine-readable instructions further cause the one or more processors to determine an average of the plurality of energy ratios for each seismic shot to generate an average energy ratio of each seismic shot and determine a likelihood of striking a subsurface geohazard when drilling into the geological subsurface based on the average energy ratio for each seismic shot.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
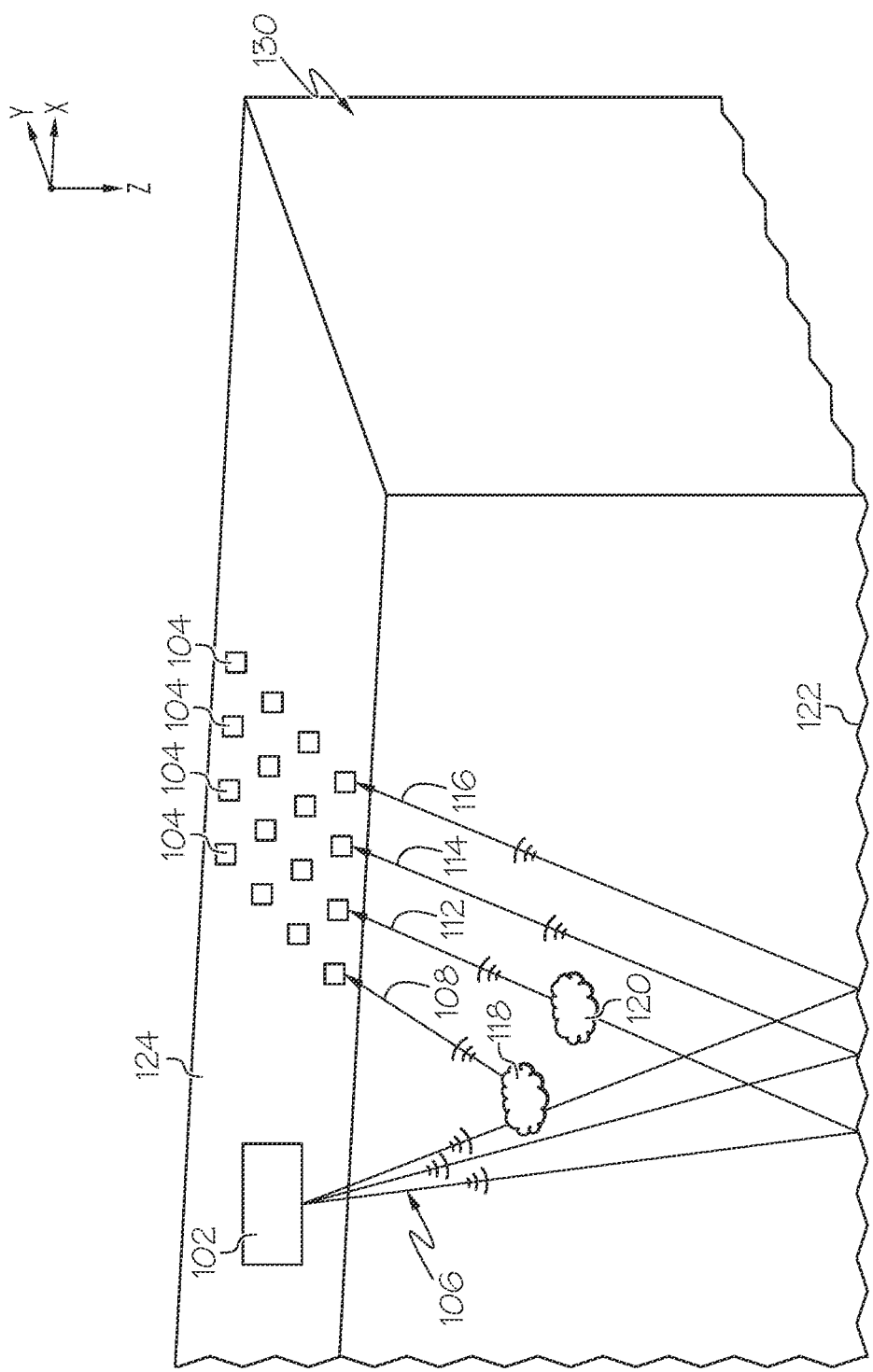
FIG. 1 schematically depicts a seismic data collection system, according to one or more embodiments described herein.

Reference will now be made in detail to embodiments of systems and methods for determining a likelihood of striking a subsurface geohazard when drilling into a geological subsurface at a particular location. The methods disclosed herein include generating or receiving a seismic data collected from the subsurface region. The seismic data may include a plurality of reflected seismic traces generated through a seismic survey of the subsurface region. The methods disclosed herein also include generating a correlogram for each reflected seismic trace of the plurality of reflected seismic traces generated from each shot of seismic energy from the seismic survey. The coda wave train of each reflected seismic trace may then be identified and isolated from the corresponding correlogram, and an energy of the coda wave train isolated from the correlogram and a total energy of each correlogram may be determined. The methods disclosed herein further include determining an energy ratio between the energy of the coda wave train and the total energy of the correlogram for each correlogram. An average energy ratio may then be determined for each shot of seismic energy generated. In other words, an average of the energy ratios between the energy of the coda wave train and total energy of the corresponding correlogram of each correlogram generated from each shot may be determined for each shot of seismic energy. Accordingly, each shot of seismic energy may be associated with a single average energy ratio and the coordinate location of the generation of the shot of seismic energy at a surface of the subsurface region.

The average energy ratios determined for each shot of seismic energy may be further analyzed by categorizing the average energy ratios in a particular category of likelihood of striking a subsurface geohazard. In other words, the average energy ratios may be grouped into categories where each category indicates a likelihood of striking a subsurface geohazard when drilling into the subsurface region at a coordinate location of the generation of a shot of seismic energy. The average energy ratios, or more specifically, the likelihood of striking a geohazard determined from each of the average energy ratios, may be plotted on a coda wave energy map at the coordinate locations of the generation of the shots of seismic energy associated with the average energy ratios. For instance, a first average energy ratio indicative of a first likelihood of striking a geohazard and derived from a first shot of seismic energy may be plotted on the coda wave energy map with a first visual indicator at the coordinate location where the first shot of seismic energy was generated, and a second average energy ratio indicative of a second likelihood of striking a geohazard and derived from a second shot of seismic energy may be plotted on the coda wave energy map with a second visual indicator at the coordinate location where the second shot of seismic energy was generated. Proposed well locations or drilling sites may further be plotted on the coda wave energy map with a visual indicator that indicates the likelihood of striking a subsurface geohazard when drilling into the subsurface region at the coordinate locations of the proposed wells along the surface.

Beneficially, determining the likelihood of striking a subsurface geohazard and generating a coda wave energy map from seismic data reduces time and expenses associated with pre-drilling surveys and studies. The present method utilizes the same raw seismic data that is frequently generated and analyzed to determine the locations of hydrocarbon reservoirs. Accordingly, the present method eliminates the need to conduct additional survey or data collection solely to determine the locations of subsurface geohazards.

As used herein, the term "module" may refer to, be part of, or include: an Application Specific Integrated Circuit (ASIC); a digital, analog, or mixed analog/digital discrete or integrated circuit; a combinational logic circuit; a field programmable gate array (FPGA); a processor circuit that executes machine-readable instructions; a memory circuit that stores machine-readable instructions executed by the processor circuit; other suitable hardware components that provide the described functionality; or a combination of some or all of the above.

Referring now to FIG. 1, a seismic data collection system 100 is depicted, according to an example embodiment. In embodiments, the seismic data collection system 100 is configured to collect seismic data. As depicted, the seismic data collection system 100 includes a seismic source 102 configured to direct a shot of seismic energy 106 into the subsurface region 130, or geological subsurface, and a plurality of receivers 104 configured to receive reflections 108, 112, 114, and 116 of the shot of seismic energy 106 off of various subsurface structures. For example, the shot of seismic energy 106 may reflect and scatter off subsurface geohazards 118 and 120. The shot of seismic energy 106 may also reflect off surface 122, which may be a discontinuity or interface between substrata of subsurface region 130. The seismic source 102 may include a sound generator (e.g., an active sound source, such as a hammer and plate, a sound gun, or an explosive; or a passive sound source such as thunder or an indirect sound source like human activity) configured to generate vibrational energy that propagates through the subsurface region 130.

In embodiments, the seismic source 102 may be movable (e.g., disposed on a truck, boat, or other motor vehicle) to produce seismic energy from a plurality of different locations on the surface 124 (e.g., along the x or y direction of the coordinate axes of FIG. 1). In embodiments, the seismic data collection system 100 includes a plurality of seismic sources 102 disposed in an array (e.g., along a line in an in-line or the x direction) to generate seismic data from a plurality of different orientations with respect to the subsurface geohazards 118 and 120 and/or the surface 122. In embodiments, the plurality of receivers 104 and the seismic source 102 may be positioned on a single structure. For example, while the seismic source 102 and plurality of receivers 104 are depicted as separately positioned along the surface 124, the seismic source 102 and plurality of receivers 104 may be placed on the underside of a single truck or other movable device. In such embodiments, the plurality of receivers 104 may be positioned to remain near offset from the seismic source 102. "Near offset," as used herein, generally refers to an offset to depth ratio of 0.5 or less. For instance, if the target depth of the shot of seismic energy 106 is 3000 meters (m), the offset between the plurality of receivers 104 and the seismic source 102 may be 1500 m or less.

The plurality of receivers 104 are depicted to be arranged in a grid-like pattern. In embodiments, the receivers 104 are equally spaced in both the x direction and the y direction (e.g., the cross-line direction) to generate a uniform measurement of the subsurface region 130. In embodiments, the receivers 104 may be near offset from the seismic source 102. In embodiments, the receivers 104 may have a non-uniform distribution or any distribution of any shape or configuration. The seismic data collection system 100 may include any number of receivers 104 depending on the implementation. The receivers 104 are generally configured to convert vibrations in the subsurface region 130 (e.g., caused by reflections 108, 112, 114, and 116) into an electrical signal (e.g., a voltage) and store the electrical signal. Deviations of the electrical signals generated via the receivers 104 are measured as a seismic response of the subsurface region 130. The reflections 108, 112, 114, and 116 may each induce separate seismic responses in each one of the receivers 104. In embodiments, the electrical signals generated and stored by each one of the receivers 104 over a time period comprises a separate reflected seismic trace of the subsurface region 130. Accordingly, the term "reflected seismic trace," as used herein, may be understood as the electrical signal generated by a receiver from the reception of vibrations, over or throughout a period of time, of one or more reflections from a subsurface region of a shot of seismic energy. In embodiments, such reflected seismic traces may be time sampled, or windowed, to generate the seismic data described herein.

Though source-receiver geometry for a single-ended spread survey is depicted in FIG. 1, it should be appreciated that the configuration depicted in FIG. 1 is exemplary only and that other source-receiver geometries associated with other survey types may also be used. The systems and methods described herein may be used to determine a likelihood of striking a geohazard and generate a coda wave energy map of a subsurface region using seismic data gathered through any technique.

Subsurface geohazards 118 and 120 may take various forms depending on the nature of the subsurface region 130. The subsurface geohazards 118 and 120 may cause variations in the seismic responses measured by the receivers 104 (e.g., due to reflections 108, 112, and 116). In other words, the presence of subsurface geohazards may influence the reflected seismic traces generated or gathered by the receivers 104. More specifically, the subsurface geohazards 118 and 120 may scatter the shot of seismic energy 106 upon injection or reflectance of the seismic energy. The scattered energy then propagates throughout the subsurface region 130, resulting in a larger temporal window of reflection. Put another way, a first reflection, such as reflection 114, that does not encounter the subsurface geohazards 118, 120 may generate vibrations that are collected at a receiver 104 during a first time window. As such, the vibrations may be entirely collected and then subside within the first time window. In contrast, a second reflection, such as reflection 112, that does encounter the subsurface geohazard 120, may generate vibrations that are collected at a receiver 104 during a second time window that is greater than the first time window. As such, the vibrations may be entirely collected and then subside within the second time window (i.e. the vibrations from the reflection 112 take a longer time to subside due to the scattered energy that propagates from the subsurface geohazard 120 throughout the subsurface region 130). With specific reference to the reflections of FIG. 1, the reflections 108, 112, and 116 represent scattered energy from the subsurface geohazards 118 and 120. In contrast, the reflection 114, which does not encounter subsurface geohazards, may not experience or exhibit any scattered energy. The subsurface geohazards 118 and 120 may include faulted rocks, sinkholes, unconsolidated depositions, or any other subsurface imperfection that may cause problems during drilling operations. Such problems during drilling may include damage or loss of equipment, loss of access to oil or natural gas reservoirs, and harm to individuals and property near the drilling site. Accurate knowledge of all of the subsurface geohazards 118 and 120 within the subsurface region 130 is therefore important for certain applications, such as petroleum exploration, because such geohazards may be directly correlated with difficulties, delays, and dangers during a drilling operation.

It is difficult to obtain accurate knowledge of the subsurface geohazards 118 and 120 using raw data measured via receivers 104. Raw seismic data, such as reflected seismic traces 302, 304 (depicted in FIG. 3), obtained directly from the receivers 104 is typically noisy. Additionally, each reflected seismic trace (e.g. reflected seismic traces 302, 304) measured or gathered via the receivers 104 may contain information pertaining to a plurality of different reflections 108, 112, 114, 116. Accordingly, various processing and analysis techniques are required to generate accurate mapping of subsurface geohazards in a subsurface region.

Figure 2:
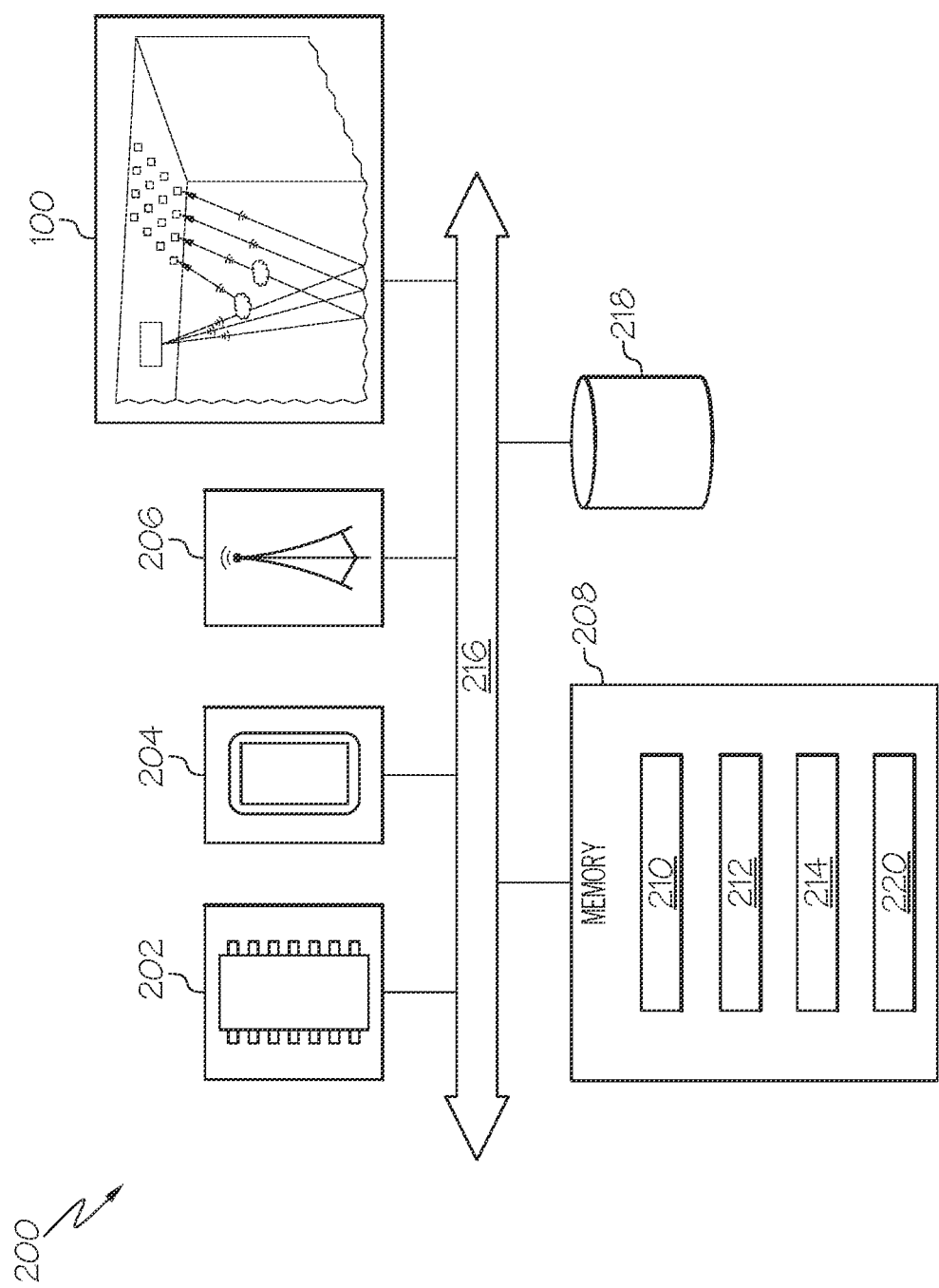
FIG. 2 schematically depicts a seismic analysis system, according to one or more embodiments described herein.

With reference to FIG. 2, an example embodiment of a seismic analysis system 200 is depicted. The seismic analysis system 200 is generally configured to generate a coda wave energy map 500 (depicted in FIG. 5) of the subsurface region 130 from raw geophysical data, such as the reflected seismic traces (e.g. reflected seismic traces 302, 304 depicted in FIG. 3) collected via seismic data collection system 100 described herein with respect to FIG. 1, and determine a likelihood of striking a subsurface geohazard (e.g. subsurface geohazards 118, 120 depicted in FIG. 1) at a proposed well site. As depicted, the seismic analysis system 200 includes a processor 202, input/output ("I/O") hardware 204, a network interface 206, a communications bus 216, a memory 208, and a database 218. In the depicted example, the seismic analysis system 200 also includes the seismic data collection system 100 described with respect to FIG. 1. For example, in embodiments, the seismic analysis system 200 may comprise a computing system connected to the plurality of receivers 104 of the seismic data collection system 100 to generate or update coda wave energy maps based on the seismic signals generated via the plurality of receivers 104 in real-time as the data is collected. In embodiments, the seismic analysis system 200 may communicate with the seismic data collection system 100 over a network via the network interface 206 to receive the data collected via the seismic data collection system 100. In embodiments, the seismic analysis system 200 does not communicate with the seismic data collection system 100 and seismic data may be uploaded to the seismic analysis system 200 via the I/O hardware 204.

While the seismic analysis system 200 is depicted to include a single processor 202, it should be appreciated that the seismic analysis system 200 may include any number of processors depending on the implementation. The processor 202 can include any suitable processing device, such as a microprocessor, microcontroller, integrated circuit, logic device, and/or other suitable processing device. In embodiments, the processor 202 is a processing circuit (e.g., either a single processing circuit or a group processing circuit) that executes some or all of the machine-readable instructions from multiple modules of one or more non-transitory computer-readable mediums (e.g., the memory 208).

I/O hardware 204 may include at least one element to receive inputs from a user and/or provide results of the computations performed via the seismic analysis system 200 to a user. For example, in embodiments, the I/O hardware 204 may include a basic input/output system (BIOS) that interacts with hardware of the seismic analysis system 200, device drivers that interact with particular devices of the seismic analysis system 200, one or more operating systems, user applications, background services, background applications, and the like. The network interface 206 can include any suitable components for interfacing with one or more network(s), including for example, transmitters, receivers, ports, controllers, antennas, and/or other suitable components. The network interface 206 may include and/or be configured to communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The database 218 may generally comprise a data storage component communicably coupled to the processor 202 via the communications bus 216. As a non-limiting example, the database 218 may include one or more database servers that support NoSQL, MySQL, Oracle, SQL Server, NewSQL, and/or the like.

The memory 208 is communicatively coupled to the processor 202. As a non-limiting example, the memory 208 may comprise one or more non-transitory computer-readable mediums that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components. Memory 208 may store instructions accessible to the processor 202 via an addressing scheme such that the processor 202 may access the memory 208 to execute the instructions in accordance with a program to perform any of the functions and operations described herein.

The memory 208 is depicted to include a correlogram module 210, an energy module 212, a likelihood module 214, and a mapping module 220. It should be appreciated that these modules are exemplary only and that the memory 208 may include any number of modules to perform the various functions of the seismic analysis system 200 described herein and the functions performed by the correlogram module 210, the energy module 212, the likelihood module 214, and the mapping module 220 may be performed by any other module consistent with the present disclosure.

The correlogram module 210 is configured to generate correlograms from raw, reflected seismic traces collected from the seismic data collection system 100. With reference to FIG. 1, the correlogram module 210 may generate a correlogram (e.g. correlograms 402, 404 depicted in FIG. 4) for the reflected seismic trace (e.g. reflected seismic traces 302, 304 depicted in FIG. 3) gathered by each receiver 104 from the reflection 108, 112, 114, and 116 of the shot of seismic energy 106. As used herein, a correlogram may be understood as a plot of correlation magnitudes, or correlation coefficients, generated from the autocorrelation of a reflected seismic trace at multiple lags versus the lags each autocorrelation and corresponding correlation magnitude was generated from. In other words, as a first step, the correlogram module 210 correlates each reflected seismic trace (e.g. reflected seismic traces 302, 304) from the reflections 108, 112, 114, and 116 with one or more lagged versions of itself. Put another way, each reflected seismic trace is correlated with one or more versions of itself, each version being offset a different length of time from the original reflected seismic trace. As a second step, the correlogram module 210 generates a plot of the correlation magnitudes, or correlation coefficients, over a sequence of lags. In other words, the correlation magnitude between a reflected seismic trace (e.g. reflected seismic trace 302, 304) and a lagged version of itself that is lagged, or offset, five time units from the reflected seismic trace, is plotted on the correlogram (e.g. correlograms 402, 404) at lag 5. Similarly, the correlation magnitude between the reflected seismic trace (e.g. reflected seismic trace 302, 304) and a lagged version of itself that is lagged, or offset, ten time units from the reflected seismic trace, is plotted on the correlogram (e.g. correlograms 402, 404) at lag 10. It should be appreciated that the lagged versions of the reflected seismic trace may be lagged any arbitrary unit of time. In other words, a first lagged version of the reflected seismic trace may be lagged one second from the reflected seismic trace, and a second lagged version of the reflected seismic trace may be lagged two seconds from the reflected seismic trace. In other embodiments, a first lagged version of the reflected seismic trace may be lagged one millisecond from the reflected seismic trace, and a second lagged version of the reflected seismic trace may be lagged two milliseconds from the reflected seismic trace. Autocorrelation and the generation of correlograms generally allows for the comparison between observations as a function of the time lag between them, identifying periodic or repeating signals from otherwise complex signals, such as reflected seismic traces.

Figure 3:
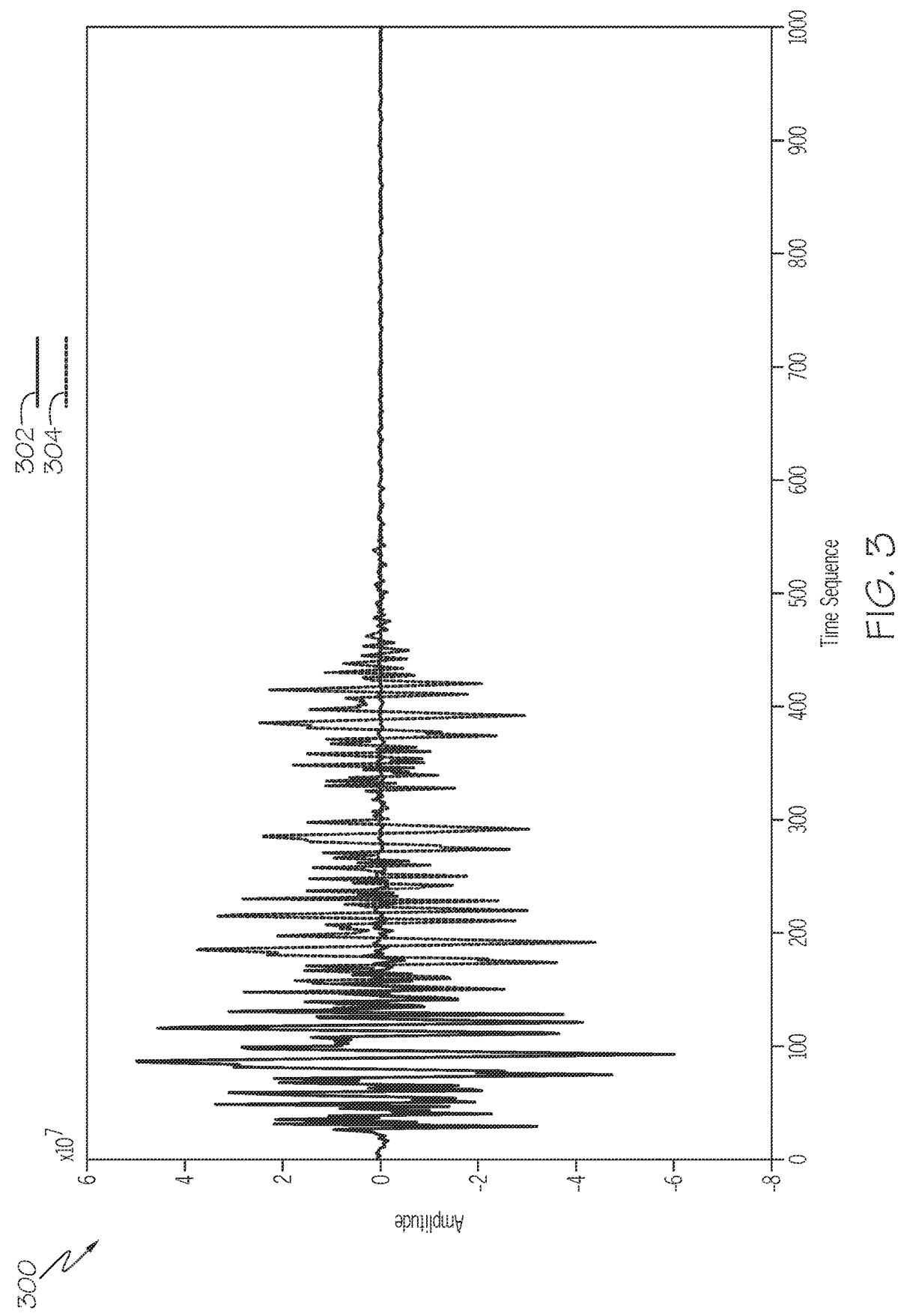
FIG. 3 depicts an example plot of reflected seismic traces collected via the seismic data collection system of FIG. 1 and seismic analysis system of FIG. 2, according to one or more embodiments described herein.
Figure 4:
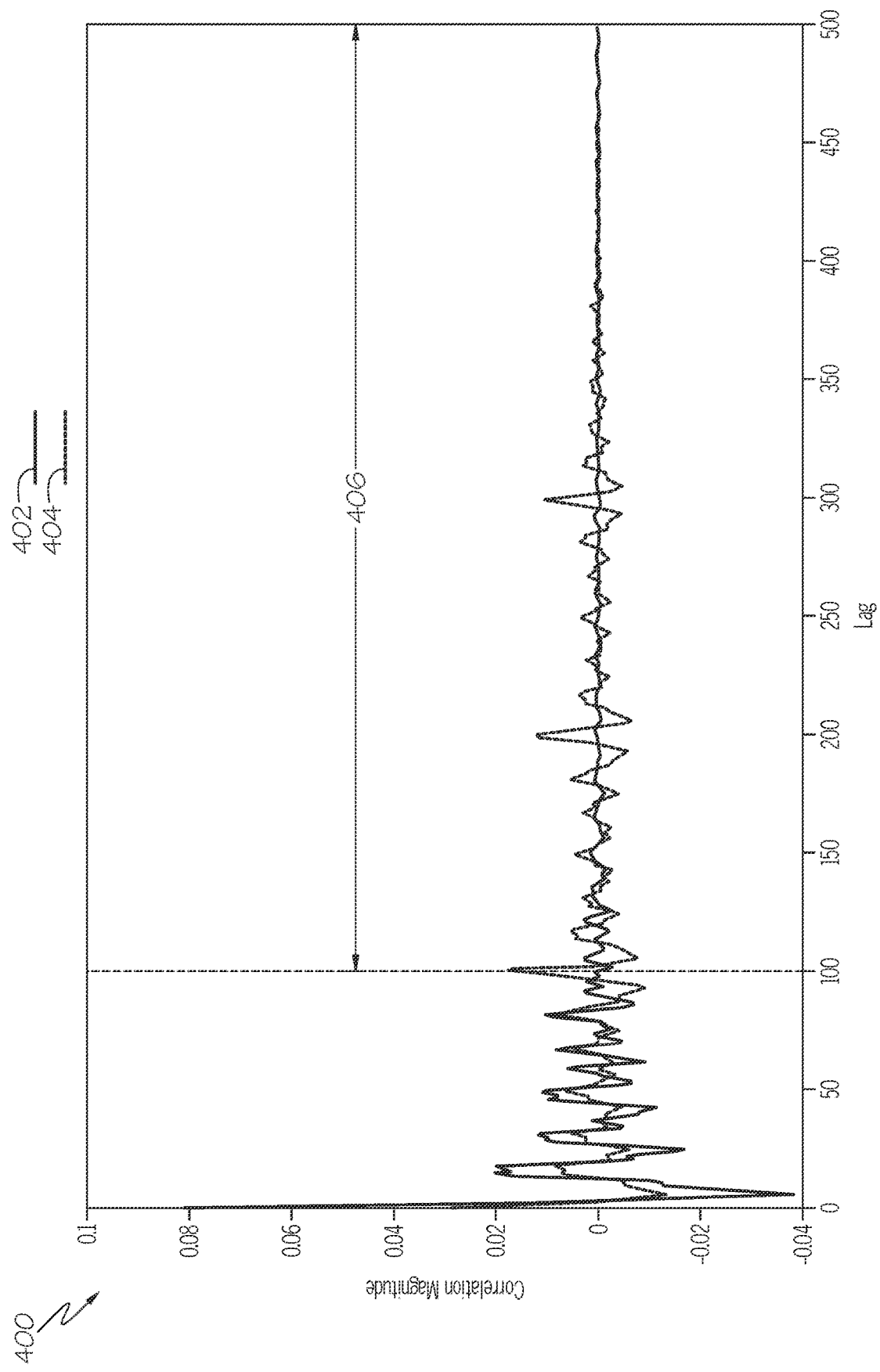
FIG. 4 depicts an example plot of correlograms of the reflected seismic traces of FIG. 3, according to one or more embodiments described herein.

With reference to FIG. 3, an example embodiment of a plot of reflected seismic traces 300 is depicted. The plot of reflected seismic traces 300 depicts an unscattered reflected seismic trace 302 and a scattered reflected seismic trace 304. For instance, with reference to FIG. 1, the unscattered reflected seismic trace 302 may correspond to the reflection 114, and the scattered reflected seismic trace 304 may correspond to the reflection 108. It should be noted that from time sequence 0 to roughly time sequence 150, the unscattered reflected seismic trace 302 and the scattered reflected seismic trace 304 predominantly overlap. With reference now to FIG. 4, an example embodiment of a correlogram plot 400 is depicted. The correlogram plot 400 corresponds to the plot of reflected seismic traces 300. The correlogram plot 400 includes a correlogram 402 that is the correlogram of the unscattered reflected seismic trace 302 and a correlogram 404 that is the correlogram of the scattered reflected seismic trace 304. As discussed above, the correlograms 402, 404 comprise a plurality of data points that each relate to a relationship or similarity between the reflected seismic traces 302, 304 and lagged versions of themselves. For example, the correlation between the scattered reflected seismic trace 304 of FIG. 3 and a version of itself lagged 50 milliseconds, seconds, or other units of time displays a first correlation magnitude, or similarity relationship, plotted on the correlogram 404, and the correlation between the scattered reflected seismic trace 304 and a version of itself lagged 100 milliseconds, seconds, or other units of time displays a second correlation magnitude, or similarity relationship, plotted on the correlogram 404. It should be appreciated that the units of measurement of the x-axis depicted in FIG. 3 may be any unit of time, including time samples for digital recordings, or seconds, milliseconds, and the like, by multiplying the time samples by the relevant time sampling rate. Similarly, the x-axis of correlogram plot 400, depicting lag, may be any unit of time, such as time samples for digital recordings. The y-axis of the plot of reflected seismic traces 300 depicted in FIG. 3 should be understood to be seismic amplitude, which is a measurement of the contrast in properties between two subsurface structures, and may be presented in any desirable units of measurement, including measurements of displacement, velocity, or acceleration, depending on the specific type and calibration of receivers 104 (FIG. 1) used.

Referring back to FIG. 2, the energy module 212 is configured to isolate the coda wave train of each correlogram (e.g. correlograms 402, 404) generated by the correlogram module 210. The coda waves are the tail of a reflected seismic trace. More particularly, the coda waves, or coda wave train, are long-duration, small-amplitude, vibrations that exhibit slow temporal decay. The coda wave train is the product of scattering, and therefore, analysis of the coda wave trains of reflected seismic traces, such as reflected seismic traces 302, 304, allows for determination of the amount or severity of heterogeneities or subsurface geohazards in a subsurface region (e.g. subsurface geohazards 118, 120 in subsurface region 130 depicted in FIG. 1). The energy module 212 identifies and isolates the coda wave train of each correlogram. For example, the coda wave train may be determined as the portion of a correlogram that corresponds to the portion of the reflected seismic trace the correlogram is generated from that follows the largest magnitude amplitude of the reflected seismic trace. This is merely one example of identifying and isolating the coda wave train of each correlogram, however. More generally, the coda wave train of a correlogram may generally be the portion of the correlogram corresponding to the coda wave train of the reflected seismic trace the correlogram is generated from, which can generally be isolated by excluding the high amplitude events of the reflected seismic trace.

With reference to FIGS. 3 and 4, the unscattered reflected seismic trace 302 and the scattered reflected seismic trace 304 display the largest magnitude of amplitude roughly at time sequence 100. With reference, to FIG. 4, the coda wave trains of the correlograms 402 and 404 may be from lag 100 onward, as shown by the domain 406. It should be appreciated that such relationship is dependent on the units of the time sequence of the plot of reflected seismic traces 300 and the units of the lags of the correlogram plot 400. In other words, if the largest magnitude of amplitude of the unscattered reflected seismic trace 302 is at time sequence 100, representing seconds, and each lagged version of the unscattered reflected seismic trace 302 is offset from the unscattered reflected seismic trace 302 in seconds by increments of one, then the coda wave train of the correlogram 402 will begin at lag 100, which corresponds to the 100 second mark of the unscattered reflected seismic trace 302. In contrast, if the largest magnitude of amplitude of the unscattered reflected seismic trace 302 is at time sequence 100, representing seconds, and each lagged version of the unscattered reflected seismic trace 302 is offset from the unscattered seismic trace 302 in half seconds by increments of one half second, then the coda wave train of the correlogram 402 will begin at lag 200, which corresponds to the 100 second mark of the unscattered reflected seismic trace 302. As noted, however, this is merely one possible example of the analysis to identify and isolate the coda wave trains. In other embodiments, the amplitude of the reflected seismic traces 302, 304 in the plot of reflected seismic traces 300 may be averaged across multiple sampling windows having different starting points in time. The computed averages may be compared to a threshold amplitude value. If the average amplitude in a sampling window is below the threshold, then the entire portion of the reflected seismic trace within the sampling window may be determined to be coda waves. Therefore, by analyzing the reflected seismic trace within a plurality of sampling windows having different starting points, the point in time marking the transition between coda waves and non-coda waves of the reflected seismic trace may be identified. This point in time may further be correlated to a lag of the corresponding correlogram of the reflected seismic trace to identify the coda wave train of the correlogram.

Still referring to FIGS. 3 and 4, the coda wave trains of the correlograms 402 and 404 effectively indicate the degree of similarity between the tail, or coda waves, of the unscattered reflected seismic trace 302 and the scattered reflected seismic trace 304 with the portions of the unscattered reflected seismic trace 302 and scattered reflected seismic trace 304, respectively, earlier in time. As the reflected seismic trace 304 scatters due to contact with subsurface geohazards 118, 120 (depicted in FIG. 1) and propagates in the subsurface region 130 (depicted in FIG. 1) for longer periods of time than the unscattered reflected seismic trace 302, the coda wave train of the scattered reflected seismic trace 304 exhibits increased similarity or correlation with portions of the scattered reflected seismic trace 304 earlier in time than the coda wave train of the unscattered reflected seismic trace 302 with portions of the unscattered reflected seismic trace 302 earlier in time. Accordingly, the coda wave train of the correlogram 404 (the portion of the correlogram 404 within the domain 406), which corresponds to the scattered reflected seismic trace 304 of FIG. 3, displays greater correlation magnitudes than the coda wave train of the correlogram 402 (the portion of the correlogram 402 within the domain 406), which corresponds to the unscattered reflected seismic trace 302 of FIG. 3.

The energy module 212 is also configured to compute an energy ratio between an energy of an isolated coda wave train of a correlogram and a total energy of the correlogram for each reflected seismic trace (and therefore correlogram) collected from the seismic data collection system 100. The energy of the isolated coda wave train of a correlogram is determined by summing the squared magnitude of the isolated coda wave train along the entire length of the isolated coda wave train. Similarly, the total energy of a correlogram is determined by summing the squared magnitude of the correlogram along its entire length. With reference to FIG. 4, the total energy of the correlogram 404 is the squared magnitude of the correlogram 404 from lag 0 to lag 500, and the energy of the isolated coda wave train of the correlogram 404 is the squared magnitude of the correlogram 404 within the domain 406 or other identified boundaries of the coda wave train. The energy module 212 is configured to compute the energy ratio between the energy of the isolated coda wave train of the correlogram and the total energy of the correlogram for each reflected seismic trace collected from a single shot of seismic energy. For example, with reference to FIGS. 1-4, the reflected seismic traces 302, 304 may both be generated from the shot of seismic energy 106, and the energy module 212 is configured to compute the energy ratio for the correlogram 402 corresponding to the unscattered reflected seismic trace 302 and the energy ratio for the correlogram 404 corresponding to the scattered reflected seismic trace 304. The energy module 212 is further configured to determine an average of the energy ratios of each correlogram of each reflected seismic trace of a single shot of seismic energy such that the single shot of seismic energy is associated with a single value, the average energy ratio of the energy ratios of the correlograms gathered from the single shot of seismic energy. In other words, the energy ratio computed for the correlogram 402 and the energy ratio computed for the correlogram 404 may be averaged such that the shot of seismic energy 106 is associated with a single average energy ratio. Prior to averaging the energy ratios, the energy module 212 may normalize the energy ratios on a scale from 0.00 to 1.00, or any other desired scale.

Referring to FIG. 2, the likelihood module 214 is further configured to determine a likelihood of striking a subsurface geohazard when drilling into a subsurface region. With reference to FIGS. 1-4, the likelihood module is configured to determine the likelihood of striking the subsurface geohazards 118, 120 when drilling into the subsurface region 130. In embodiments, the likelihood module 214 may determine categories of average energy ratios, each category of average energy ratios associated with a likelihood of striking one or both subsurface geohazards 118, 120. For example, in some embodiments, the likelihood module 214 generates two categories of likelihoods. For instance, an average energy ratio between 0.00 and 0.50 may be categorized as indicative of a low likelihood of striking the subsurface geohazards 118, 120, and an average energy ratio of 0.51 to 1.00 may be categorized as indicative of a high likelihood of striking the subsurface geohazard 118, 120. In some embodiments, the likelihood module 214 may generate three categories of likelihoods that are indicative of a low likelihood of striking the subsurface geohazards 118, 120, a medium likelihood of striking the subsurface geohazards 118, 120, and a high likelihood of striking the subsurface geohazards 118, 120. In some embodiments, the likelihood module 214 generates four categories of likelihoods that are indicative of a very low likelihood of striking the subsurface geohazards 118, 120, a low likelihood of striking the subsurface geohazards 118, 120, a medium likelihood of striking the subsurface geohazards 118, 120, and a high likelihood of striking the subsurface geohazards 118, 120.

The above are merely examples of likelihood categorization, however. For instance, the likelihood module 214 may be configured to generate any desirable number of categories of likelihood. Additionally, the categories of likelihood do not need to be evenly weighted or distributed throughout the possible range of average energy ratios. For example, in some embodiments, the likelihood module 214 may be configured to generate two categories of likelihood. An average energy ratio between 0.00 and 0.20 may be categorized as indicative of a low likelihood of striking the subsurface geohazards 118, 120, and an average energy ratio between 0.21 and 1.00 may be categorized as indicative of a high likelihood of striking the subsurface geohazards 118, 120. It should also be appreciated that instead of categories, the determination of likelihoods of striking the subsurface geohazards 118, 120 may also be characterized in terms of threshold values. In other words, an average energy ratio beneath a threshold value may indicate a low likelihood of striking the subsurface geohazards 118, 120, and an average energy ratio above a threshold value may indicate a high likelihood of striking the subsurface geohazards 118, 120.

The likelihood module 214 is further configured to associate the average energy ratio and determined likelihood of striking a subsurface geohazard with a particular coordinate location. More specifically, in embodiments, the likelihood module 214 may associate the determined likelihood of striking a subsurface geohazard with a depth of a subsurface region extending beneath the location of the generation of the shot of seismic energy at the surface of the subsurface region. For example, with reference to FIG. 1-4, the likelihood module 214 may determine that the average energy ratio of the energy ratios of the correlograms 402, 404 collected from the shot of seismic energy 106 is indicative of a high risk of striking a subsurface geohazard (e.g. one of subsurface geohazards 118, 120). The likelihood module 214 may associate this high risk with the x-y coordinates of the generation of the shot of seismic energy 106. In other words, the likelihood module 214, may specifically determine that there is a high risk of striking a geohazard when drilling into the depth (e.g. the z direction of the coordinate axes of FIG. 1) of the subsurface region 130 at the x-y coordinate along the surface 124 of the subsurface region 130 where the shot of seismic energy 106 was generated. In other embodiments, the likelihood module 214 may associate the risk with the x-y coordinates of the location of the entire seismic data collection system 100. In other words, the likelihood module 214 may determine that there is a high risk of striking a geohazard when drilling into the depth (e.g. the z direction of the coordinate axes of FIG. 1) of the subsurface region 130 at x-y coordinates along the surface 124 of the subsurface region 130 that the seismic source 102 and receivers 104 span.

While the memory 208, and more specifically, the correlogram module 210, the energy module 212, and the likelihood module 214 have been discussed with reference to a single shot of seismic energy 106 (depicted in FIG. 1), in embodiments, the above determinations can be made with respect to a plurality of shots of seismic energy 106. In other words, with reference to FIG. 1, in order to determine the risk of striking a subsurface geohazard throughout a large volume of the subsurface region 130, the seismic source 102 may be moved and stationed at a plurality of locations across the surface 124, and a shot of seismic energy 106 may be generated at each location across the surface 124. Accordingly, a plurality of shots of seismic energy 106 may be generated at the surface 124, and each shot of seismic energy 106 may result in a plurality of reflected seismic traces (e.g. 302, 304 depicted in FIG. 3) recorded by the receivers 104 and seismic analysis system 200. The correlogram module 210 may generate a correlogram (e.g. 402, 404 depicted in FIG. 4) for each reflected seismic trace 302, 304 recorded from each shot of seismic energy 106. The energy module 212 may then isolate the coda wave train of each correlogram 402, 404 associated with each of the plurality of shots of seismic energy 106. The energy module 212 may further compute an energy ratio between the energy of the isolated coda wave train and the total energy of the correlogram 402, 404 of each reflected seismic trace 302, 304 of each shot of seismic energy 106, and further determine an average energy ratio for each shot of seismic energy 106 of the plurality of shots of seismic energy 106. Accordingly, each of the plurality of shots of seismic energy 106 generated across the surface 124 may be associated with a respective average energy ratio. The likelihood module 214 may categorize each average energy ratio to determine a likelihood of striking a subsurface geohazard (e.g. 118, 120 depicted in FIG. 1) and further associate each average energy ratio, and therefore the likelihood of striking a subsurface geohazard derived from each average energy ratio, with the particular coordinate location of the generation of the corresponding shot of seismic energy 106 along the surface 124. In other words, the likelihood module 214 may generate an array of average energy ratios and categorized likelihoods of striking a subsurface geohazard across the surface 124 of the subsurface region 130, each average energy ratio and categorized likelihood of striking a subsurface geohazard corresponding to a specific shot of seismic energy 106 and a specific coordinate location along the surface 124.

Figure 5:
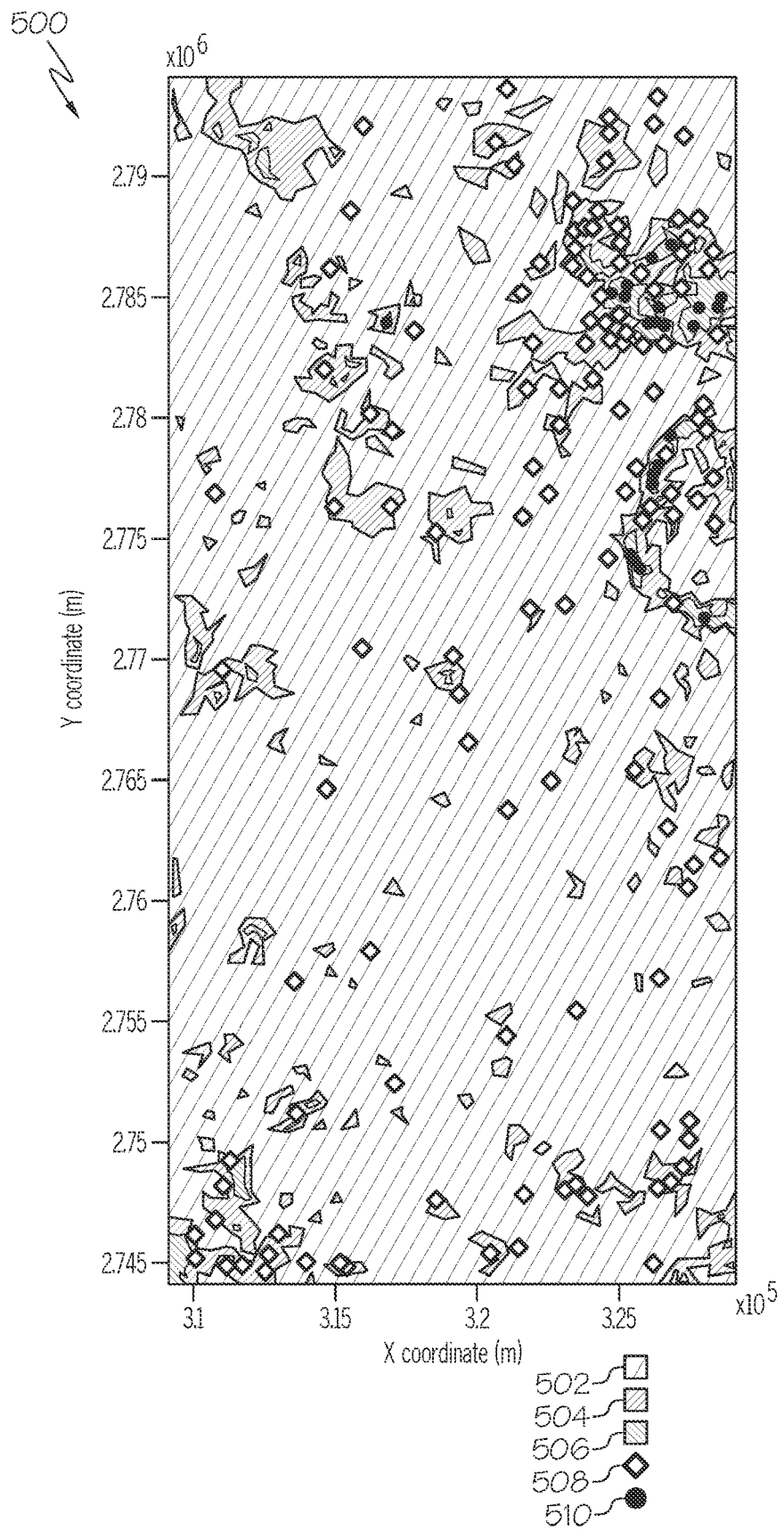
FIG. 5 depicts an example coda wave energy map, according to one or more embodiments described herein.

Referring to FIG. 1-5, the mapping module 220 may be configured to generate a coda wave energy map 500 of the subsurface region 130. The coda wave energy map 500 may include a visual display of the average energy ratios and likelihood of striking a subsurface geohazard (e.g. 118, 120) associated with each shot of seismic energy 106 along the surface 124 of the subsurface region 130 of interest. With reference to FIG. 5, a coda wave energy map 500 is depicted according to example embodiments. The mapping module 220 may assign or associate a unique color, pattern, or other visual indicator to each category of likelihood determined by the likelihood module 214. For instance, a low likelihood of striking a subsurface geohazard may be assigned a first visual indicator, a medium likelihood of striking a subsurface geohazard may be assigned a second visual indicator, and a high likelihood of striking a subsurface geohazard may be assigned a third visual indicator. As explained above, each average energy ratio and likelihood of striking a subsurface geohazard is associated with a coordinate location of a shot of seismic energy 106 generated along the surface 124 (depicted in FIG. 1). Accordingly, the mapping module 220 may plot each average energy ratio and/or determined likelihood of striking a subsurface geohazard on the coda wave energy map 500 with its assigned visual indicator at the coordinate location of the generation of its shot of seismic energy 106. More specifically, locations along the surface 124 where a shot of seismic energy 106 was generated, and it was determined that the average energy ratio of the energy ratios of the correlograms (402, 404 depicted in FIG. 4) of the shot of seismic energy 106 indicate a low likelihood of striking a geohazard, are plotted on the coda wave energy map 500 with a visual indicator 502. Locations along the surface 124 where a shot of seismic energy 106 was generated, and it was determined that the average energy ratio of the energy ratios of the correlograms (402, 404 depicted in FIG. 4) of the shot of seismic energy 106 indicate a medium likelihood of striking a geohazard, are plotted on the coda wave energy map 500 with a visual indicator 504. Locations along the surface 124 where a shot of seismic energy 106 was generated, and it was determined that the average energy ratio of the energy ratios of the correlograms (402, 404 depicted in FIG. 4) of the shot of seismic energy 106 indicate a high likelihood of striking a geohazard, are plotted on the coda wave energy map 500 with a visual indicator 506. Accordingly, the coda wave energy map 500 allows a user to view the map 500, identify a location along the surface 124 at its coordinates, and visually determine the likelihood of striking a subsurface geohazard by drilling into the subsurface region 130 at the surface 124 coordinates.

Referring to FIG. 5, the mapping module 220 may further be configured to plot the locations of proposed wells or drilling locations on the coda wave energy map 500. For instance, through the I/O hardware 204, a user may input locations of proposed well locations. The proposed well locations, for instance, may be at locations where hydrocarbon reservoirs are identified. The mapping module may assign a well visual indicator to each proposed well and plot the well visual indicator at the location of each proposed well. The well visual indicator that the mapping module 220 assigns to a well location is determined by the likelihood of striking a geohazard at the proposed well location. For instance, a proposed well location at a coordinate location determined to have a low likelihood of striking a subsurface geohazard may be assigned a first well visual indicator, a proposed well location at a coordinate location determined to have a medium likelihood of striking a subsurface geohazard may be assigned a second well visual indicator, and a proposed well location at a coordinate location determined to have a high likelihood of striking a subsurface geohazard may be assigned a third visual indicator. This is merely an example, however, and other well visual indicator assignment schemes may be employed. For instance, the coda wave energy map 500 includes a first well visual indicator 508 at coordinates of proposed well locations determined to have a low or medium likelihood of striking a subsurface geohazard and a second well visual indicator 510 at coordinates of proposed well locations determined to have a high likelihood of striking a subsurface geohazard. The first well visual indicator 508 may therefore indicate that a drilling operation may optionally be conducted at the proposed well location, and the second well visual indicator 510 may indicate that a drilling operation should not be conducted at the proposed well location. The well visual indicators may vary based on shape, color, pattern, and/or any other visually recognizable attribute.

Figure 6:
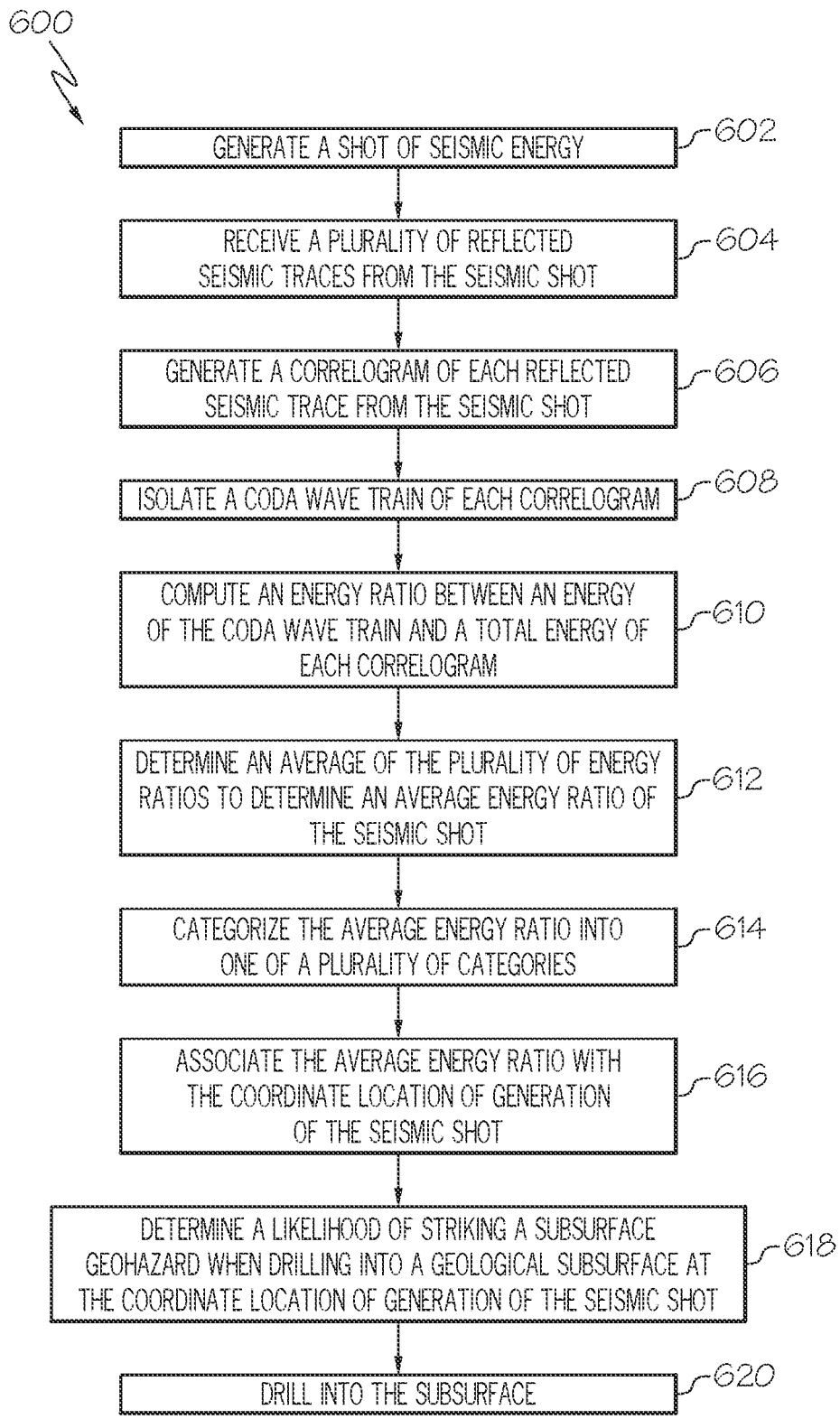
FIG. 6 depicts a process for determining a likelihood of striking a subsurface geohazard, according to one or more embodiments described herein.

Referring now to FIG. 6, a method 600 of determining a likelihood of striking a subsurface geohazard based on coda wave trains is depicted, according to an example embodiment. The method 600 may be performed via the seismic analysis system 200 described herein with respect to FIG. 2.

Referring to FIGS. 1-6 in a step 602 of the method 600, the shot of seismic energy 106 is generated by the seismic source 102 and is directed toward a subsurface region 130 of interest. The seismic source 102 generates the shot of seismic energy 106 at a particular location at the surface 124 of the subsurface region 130. In a step 604, a plurality of reflected seismic traces (e.g. 302, 304) are received from the shot of seismic energy 106. The plurality of reflected seismic traces 302, 304 are received by one or more receivers 104 positioned along the surface 124 of the subsurface region 130 that are near offset from the seismic source 102. In a step 606, a correlogram (e.g. 402, 404) of each reflected seismic trace 302, 304 received by the receivers 104 at step 604 is generated. In other words, each reflected seismic trace 302, 304 is correlated with one or more lagged versions of itself to generate a correlogram 402, 404. Accordingly, a plurality of correlograms 402, 404, each generated from one of the plurality of reflected seismic traces 302, 304 received at step 604, are derived from the shot of seismic energy 106.

In a step 608 of the method 600, the coda wave train of each correlogram 402, 404 is isolated. In a step 610, an energy ratio is computed between the energy of each coda wave train and the total energy of the respective correlogram 402, 404 that each coda wave train is isolated from. The energy of the coda wave train is computed as the sum of the squared magnitude of the coda wave train along the full length of the coda wave train, and the total energy of each correlogram 402, 404 is computed as the sum of the squared magnitude of each correlogram 402, 404 along its total length. Each of the plurality of correlograms 402, 404 derived from the shot of seismic energy 106 has its own energy ratio. In a step 612, an average energy ratio is computed for the shot of seismic energy 106. In other words, an average of each energy ratio of the plurality of correlograms 402, 404 derived from the shot of seismic energy 106 is computed.

In a step 614, the average energy ratio computed at step 612 is categorized into one of a plurality of categories indicative of a likelihood of striking a subsurface geohazard. For instance, if the average energy ratio falls within a range of ratios defined by a first category, then a first likelihood of striking a subsurface geohazard is assigned to the average energy ratio, and if the average energy ratio falls within a range of ratios defined by a second category, then a second likelihood of striking a subsurface geohazard is assigned to the average energy ratio. Put another way, if the average energy ratio falls below a first threshold value, above a first threshold value, or between two threshold values, a particular likelihood of striking a subsurface geohazard may be assigned to the average energy ratio. A larger average energy ratio indicates an increased likelihood of striking a subsurface geohazard. In a step 616, the average energy ratio, and therefore the likelihood of striking a geohazard determined from the average energy ratio at step 614, is associated with the coordinate location of the generation of the shot of seismic energy 106 at step 602. In other words, with respect to FIG. 1, the average energy ratio and the likelihood of striking a geohazard are assigned to the x-y coordinates along the surface 124 where the seismic source 102 generated the shot of seismic energy 106. In a step 618, the likelihood of striking a subsurface geohazard when drilling into the subsurface region 130 at the coordinate location of the generation of the shot of seismic energy 106 may be determined. In other words, based on the categorization, or comparison to a threshold average energy ratio, at step 614 and the association to the coordinate location of the shot of seismic energy 106 at step 616, the likelihood of striking a subsurface geohazard when drilling into the subsurface region 130 from the point along the surface 124 of the subsurface region 130 where the shot of seismic energy 106 was generated may be determined. In a step 620, if the average energy ratio is beneath a threshold value, or within a first category, and represent an acceptable likelihood of striking a subsurface geohazard (i.e. a user may only wish to drill if the average energy ratio is indicative of a low likelihood of striking a subsurface geohazard, a low or medium risk, etc.) a user may drill into the subsurface region 130 at the point along the surface 124 of the subsurface region 130 where the shot of seismic energy 106 was generated.

It should be appreciated that the method 600 discussed above is not limited to the order of steps presented in FIG. 6. For instance, in some embodiments, associating the average energy ratio with the coordinate location of generation of the shot of seismic energy 106 at step 616 may be completed prior to categorizing the average energy ratio into one of a plurality of likelihood categories at step 614. Similarly, it should be appreciated that one or more steps may be consolidated or performed simultaneously. For example, associating the average energy ratio with the coordinate location of generation of the shot of seismic energy 106 at step 616 and determining a likelihood of striking a subsurface geohazard when drilling into the subsurface region 130 at the coordinate location of generation of the shot of seismic energy 106 at step 618 may be performed substantially simultaneously. Accordingly, the method 600 is not limited to the exact number and order of steps listed. Moreover, it should be appreciated that the method 600 may be performed for a plurality of shots of seismic energy 106. In other words, with respect to FIG. 1, the method 600 may be performed for each of a plurality of shots of seismic energy 106 generated at different locations along the surface 124. The method 600 may be completed in totality for a first shot of seismic energy prior to proceeding to the analysis of a second shot of seismic energy, each of the plurality of shots of seismic energy may be analyzed simultaneously (the method 600 for each shot may be completed simultaneously), or a subset of steps may be completed in sequence and a subset of steps may be completed simultaneously. For instance, each shot of seismic energy may be generated and received individually, and following the generation of all desired shots of seismic energy, the steps 606-618 for each of the plurality of shots of seismic energy may be completed simultaneously.

Figure 7:
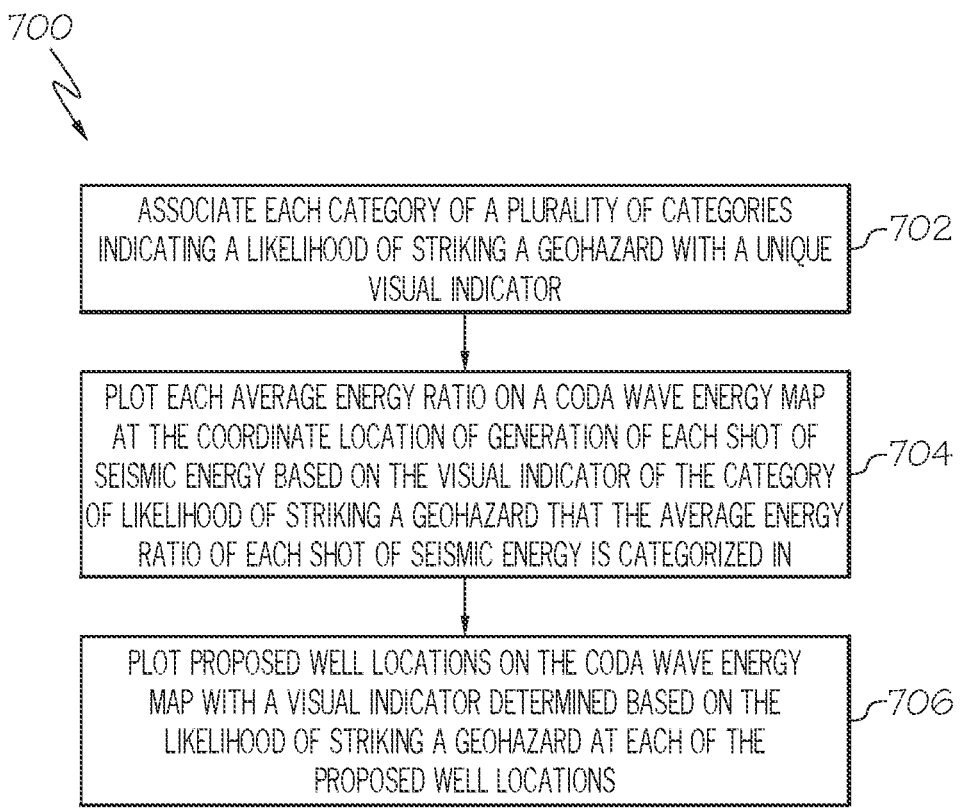
FIG. 7 depicts a process for generating a coda wave energy map, according to one or more embodiments described herein.

Referring now to FIG. 7, a method 700 of determining a coda wave energy map is depicted, according to an example embodiment. With reference to FIGS. 1-7, the method 700 may be performed via the seismic analysis system 200. The coda wave energy map 500 may provide visual indications of the likelihood of striking a subsurface geohazard at a particular coordinate location. The method 700 is completed after the method 600, discussed above, is completed with respect to a plurality of shots of seismic energy 106 at different locations along a surface 124 of a subsurface region 130. Accordingly, prior to the method 700, an average energy ratio may be determined for each of a plurality of shots of seismic energy 106 across the surface 124, and each of the average energy ratios may be categorized into one of a plurality of categories, or compared to one or a plurality of threshold values, indicative of a likelihood of striking a subsurface geohazard when drilling into the surface 124 of the subsurface region 130. In embodiments in which the coda wave energy map 500 is generated via method 700, a user may wait to drill into the subsurface region 130 at step 620 until method 700 is complete (i.e. a user may wish to reference the coda wave energy map 500 before drilling). In other embodiments, though, even when the method 600 is completed with respect to a plurality of shots of seismic energy 106, a user may choose to drill at one or more locations based on the average energy ratio computed for each shot of seismic energy 106, or more specifically, the comparison of each average energy ratio to one or more threshold values or categories of likelihood, without proceeding to the method 700 and referencing the coda wave energy map 500.

In a step 702 of the method 700, each category of a plurality of categories indicating a likelihood of striking a geohazard (discussed with respect to FIG. 6) is associated with a unique visual indicator. For instance, a first category may be defined by a first range of average energy ratios and indicate a first likelihood of striking a subsurface geohazard, and a second category may be defined by a second range of average energy ratios and indicate a second likelihood of striking a subsurface geohazard. Accordingly, if an average energy ratio of a first shot of seismic energy falls within the first range of average energy ratios defined by the first category, the first likelihood of striking a subsurface geohazard may be assigned to the average energy ratio, and if an average energy ratio of a second shot of seismic energy falls within the second range of average energy ratios defined by the second category, the second likelihood of striking a subsurface geohazard may be assigned to the average energy ratio. As each category of likelihoods is also associated with a unique visual indicator, the average energy ratio of the first shot of seismic energy will also be assigned a first visual indicator associated with the first category. Similarly, the average energy ratio of the second shot of seismic energy will be assigned a second visual indicator associated with the second category.

In a step 704, each average energy ratio, or determined likelihood of striking a subsurface geohazard, which is associated with the coordinate location of the generation of a respective shot of seismic energy 106, is plotted on the coda wave energy map 500 at the coordinate location of generation of each shot of seismic energy 106. Each average energy ratio may be plotted based on the visual indicator of the category of likelihood of striking a geohazard that the average energy ratio is categorized in. In other words, based on the average energy ratio of each shot of seismic energy 106, a likelihood of striking a geohazard may be determined, and a visual indicator associated with a category of likelihood may be assigned to each shot of seismic energy 106. Accordingly, an average energy ratio or likelihood of striking a geohazard may be plotted on the coda wave energy map 500 at the coordinates of generation of the respective shot of seismic energy 106 with the visual indicator associated with the category of likelihood that the average energy ratio is categorized in. For example then, if it is determined, based on the average energy ratio and category of likelihood the average energy ratio is categorized in that there is a low likelihood of striking a geohazard when drilling into the subsurface region 130 at the coordinate location of a shot of seismic energy 106 generation, the coordinates of the generation of the shot of seismic energy 106 on the coda wave energy map may display a first visual indicator associated with the low likelihood. Similarly, if it is determined, based on the average energy ratio and category of likelihood the average energy ratio is categorized in that there is a high likelihood of striking a geohazard when drilling into the subsurface region 130 at the coordinate location of a shot of seismic energy 106 generation, the coordinates of the generation of the shot of seismic energy 106 on the coda wave energy map may display a second visual indicator associated with the high likelihood.

In a step 706, proposed well locations may be plotted on the coda wave energy map with a specific well location visual indicator. For instance, based on the positions of hydrocarbon reservoirs, there may be a plurality of specific locations across the surface 124 that are of particular interest for drilling into the subsurface region 130. The proposed well locations may be plotted on the coda wave energy map 500 with visual indicators or markers related to the likelihood of striking a geohazard when drilling into the subsurface region 130 at the locations of the proposed wells. For instance, based on the step 704, the degree of likelihood of striking a geohazard at a particular coordinate location on the coda wave energy map 500 is known and visually indicated. The well location visual indicators placed on the coda wave energy map 500 at the proposed well locations may provide further visual clarification of the likelihood of striking a geohazard at the proposed well sites, specifically. For instance, if it is determined that there is a low likelihood of striking a geohazard at a first proposed well site, the proposed well site may be plotted on the coda wave energy map 500 with a first visual indicator, indicating that a drilling operation may be conducted at that specific site. If it is determined that there is a medium likelihood of striking a geohazard at a first proposed well site, the proposed well site may be plotted on the coda wave energy map 500 with a second visual indicator, indicating that a drilling operation may be optionally conducted at that specific site with caution. If it is determined that there is a high likelihood of striking a geohazard at a first proposed well site, the proposed well site may be plotted on the coda wave energy map 500 with a third visual indicator, indicating that a drilling operation should not be conducted at that specific site.

It should be appreciated that the method 700 discussed above is not limited to the specific order of steps presented in FIG. 7. Similarly, it should be appreciated that one or more steps may be consolidated or performed simultaneously, omitted, or additionally added. Accordingly, the method 700 is not limited to the exact number and order of steps listed.

In view of the foregoing description, it should be understood that determining the likelihood of striking a subsurface geohazard when drilling into a subsurface region at a particular surface location may be efficiently and accurately determined by isolating and analyzing coda wave trains from correlograms of reflected seismic traces. It should also be understood that coda wave energy maps may be generated to visually indicate the likelihoods of striking a subsurface geohazard when drilling at particular surface locations and that proposed well locations may further be plotted on the coda wave energy maps to allow users to quickly visually determine the likelihood of striking a geohazard at a specific proposed well location. Beneficially, the methods and techniques disclosed herein utilize raw reflected seismic trace data generated from shots of seismic energy. In other words, the methods described herein utilize raw seismic data traces that is often generated to identify hydrocarbon reservoirs. Accordingly, the present methods may utilize preexisting raw data and obviate the need for additional studies and raw data collection on a subsurface region to locate and determine the likelihood of striking subsurface geohazards.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

It is noted that terms like "preferable," "typical," and "suitable" when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method comprising:
   generating a seismic shot by a seismic source, the seismic shot directed at a geological subsurface;
   receiving, by one or more receivers, a plurality of reflected seismic traces from the seismic shot;
   generating a correlogram of each reflected seismic trace of the plurality of reflected seismic traces to generate a plurality of correlograms;
   isolating a coda wave train of each correlogram of the plurality of correlograms;
   computing an energy ratio between an energy of the coda wave train of each correlogram and a total energy of a corresponding correlogram of the plurality of correlograms to generate a plurality of energy ratios;
   determining an average of the plurality of energy ratios to generate an average energy ratio of the seismic shot;
   determining a likelihood of striking a subsurface geohazard when drilling into the geological subsurface based on the average energy ratio.

2. The method of claim 1 further comprising drilling into the geological subsurface, when the average energy ratio is below a threshold average energy ratio.

3. The method of claim 2, wherein the average energy ratio is indicative of a first likelihood of striking the subsurface geohazard when the average energy ratio is below the threshold average energy ratio, and the average energy ratio is indicative of a second likelihood of striking the subsurface geohazard when the average energy ratio is above the threshold average energy ratio.

4. The method of claim 1 further comprising:
   associating the average energy ratio with a coordinate location of generation of the seismic shot;
   determining the likelihood of striking the subsurface geohazard when drilling into the geological subsurface at the coordinate location of generation of the seismic shot; and
   drilling into the geological subsurface at the coordinate location of generation of the seismic shot when the average energy ratio is below a threshold average energy ratio.

5. The method of claim 1, wherein the coda wave train is a segment of each correlogram following a lag that corresponds to a first time sequence of a corresponding reflected seismic trace, wherein a largest magnitude of amplitude of the corresponding reflected seismic trace is at the first time sequence.

6. The method of claim 1, wherein a larger average energy ratio is indicative of a higher likelihood of striking the subsurface geohazard.

7. A method comprising:
   generating a plurality of seismic shots by one or more seismic sources, the plurality of seismic shots directed at a geological subsurface;
   receiving, by one or more receivers, a plurality of reflected seismic traces from each seismic shot of the plurality of seismic shots;

generating a correlogram of each reflected seismic trace of the plurality of reflected seismic traces of each seismic shot to generate a plurality of correlograms of each seismic shot;

isolating a coda wave train of each correlogram of the plurality of correlograms of each seismic shot;

computing an energy ratio between an energy of the coda wave train of each correlogram and a total energy of a corresponding correlogram to generate an energy ratio of each correlogram generated from each reflected seismic trace from each seismic shot, thereby generating a plurality of energy ratios for each seismic shot;

determining an average of the plurality of energy ratios for each seismic shot to generate an average energy ratio for each seismic shot; and determining a likelihood of striking a subsurface geohazard when drilling into the geological subsurface based on the average energy ratio for each seismic shot.

8. The method of claim 7, wherein the coda wave train of each correlogram is a segment of each correlogram following a lag that corresponds to a first time sequence of a corresponding reflected seismic trace, wherein a largest magnitude of amplitude of the corresponding reflected seismic trace is at the first time sequence.

9. The method of claim 7 further comprising:
associating the average energy ratio for each seismic shot with a coordinate location of generation of each seismic shot; and
determining the likelihood of striking the subsurface geohazard when drilling into the geological subsurface at the coordinate location of generation of each seismic shot.

10. The method of claim 9 further comprising:
drilling into the geological subsurface at a coordinate location of generation of a first seismic shot, when the average energy ratio associated with the first seismic shot is below a threshold average energy ratio.

11. The method of claim 9, wherein a larger average energy ratio is indicative of a higher likelihood of striking the subsurface geohazard.

12. The method of claim 9 further comprising normalizing the energy ratio of each seismic shot.

13. The method of claim 9, wherein the average energy ratio for each seismic shot is categorized into one of a plurality of categories, wherein each category of the plurality of categories indicates a likelihood of striking the subsurface geohazard.

14. The method of claim 9 further comprising generating a coda wave energy map of the geological subsurface.

15. The method of claim 14 wherein, the average energy ratio for each seismic shot is plotted on the coda wave energy map at the coordinate location of generation of each seismic shot.

16. The method of claim 15, wherein:
the average energy ratio for each seismic shot is categorized into one of a plurality of categories;
each category of the plurality of categories indicates a likelihood of striking the subsurface geohazard;
each category of the plurality of categories is associated with a visual indicator; and
the average energy ratio for each seismic shot within a first category of the plurality of categories is plotted on the coda wave energy map with the visual indicator of the first category.

17. The method of claim 14 further comprising plotting proposed well locations on the coda wave energy map.

18. The method of claim 17 further comprising assigning a well visual indicator to each of the proposed well locations plotted on the coda wave energy map, wherein the well visual indicator assigned to each proposed well location is determined based on a likelihood of striking the subsurface geohazard at the proposed well location.

19. A seismic analysis system comprising:
a seismic data collection system, further comprising:
one or more seismic sources; and
one or more receivers;
one or more processors communicatively coupled to the one or more receivers; and
one or more non-transitory memory modules communicatively coupled to the one or more processors and storing machine-readable instructions that, when executed, cause the one or more processors to:
generate a correlogram of each of a plurality of reflected seismic traces received by the one or more receivers from a plurality of seismic shots generated by the one or more seismic sources to generate a plurality of correlograms of each seismic shot of the plurality of seismic shots, the one or more receivers receiving a plurality of reflected seismic traces from each seismic shot;
isolate a coda wave train of each correlogram of the plurality of correlograms of each seismic shot;
compute an energy ratio between an energy of the coda wave train of each correlogram and a total energy of a corresponding correlogram to generate an energy ratio of each correlogram generated from each reflected seismic trace from each seismic shot, thereby generating a plurality of energy ratios for each seismic shot;
determine an average of the plurality of energy ratios for each seismic shot to generate an average energy ratio for each seismic shot; and
determine a likelihood of striking a subsurface geohazard when drilling into the geological subsurface based on the average energy ratio for each seismic shot.

20. The seismic analysis system of claim 19, wherein the machine readable instructions, when executed, further cause the one or more processors to:
associate the average energy ratio for each seismic shot with a coordinate location of generation of each seismic shot;
categorize the average energy ratio for each seismic shot within one of a plurality of categories, wherein:
each category of the plurality of categories indicates a likelihood of striking the subsurface geohazard at the coordinate location of generation of each seismic shot; and
each category of the plurality of categories is associated with a visual indicator; and
plot the average energy ratio for each seismic shot on a coda wave energy map at the coordinate location of generation of each seismic shot with the visual indicator of the one of the plurality of categories the average energy ratio for each seismic shot is categorized within.

\* \* \* \* \*